United States Patent [19]

Harrison et al.

[11] Patent Number: 4,529,167
[45] Date of Patent: Jul. 16, 1985

[54] VALVE APPARATUS

[75] Inventors: George W. Harrison, Houston; Robert L. Holder, Pearland; John P. Kearns, Houston, all of Tex.

[73] Assignee: Team, Inc., Houston, Tex.

[21] Appl. No.: 501,519

[22] Filed: Jun. 6, 1983

[51] Int. Cl.³ .............................................. F16K 5/02
[52] U.S. Cl. ................................... 251/144; 251/349; 251/352
[58] Field of Search ............... 251/349, 350, 351, 352, 251/353, DIG. 1, 144, 143, 142, 145; 137/286, 616

[56] References Cited

U.S. PATENT DOCUMENTS

| | | | |
|---|---|---|---|
| 2,524,951 | 10/1950 | Ashton | 251/DIG. 1 |
| 2,594,626 | 4/1952 | Earle | 251/DIG. 1 |
| 2,772,692 | 12/1956 | Russell | 251/349 |
| 2,859,932 | 11/1958 | Mackal | 251/349 |
| 3,184,091 | 5/1965 | Hoffman | 251/351 |
| 3,601,358 | 8/1971 | Cruse | 251/144 |
| 3,680,582 | 8/1972 | Pauliukonij | 251/DIG. 1 |
| 3,703,189 | 11/1972 | Koller | 251/144 |
| 3,948,481 | 4/1976 | Pollock | 251/144 |
| 4,395,018 | 7/1983 | Moen | 251/DIG. 1 |

FOREIGN PATENT DOCUMENTS 1425731 12/1968 Fed. Rep. of Germany ... 251/DIG. 1

Primary Examiner—Samuel Scott
Assistant Examiner—Helen A. Odar
Attorney, Agent, or Firm—Guy E. Matthews

[57] ABSTRACT

A housing having a longitudinal aperature therethrough, and an exterior surface adapted to be securable to a container. A stem is longitudinally movable within the housing and is cooperatively conformed with the housing such that an annulus exists between a portion of the housing and the stem. The stem includes a plurality of ports allowing fluid communication between the annulus and a longitudinal cavity extending from the top end of the stem. A sealing instrumentality if included proximate a bottom end of the valve to prevent the flow of fluid into the valve annulus when the valve is in a first "closed" position. The stem is adapted to be moved longitudinally within the housing to a second, "open", position wherein the sealing instrumentality is released and fluid may enter the annulus and pass through the ports to exit the valve through the stem cavity.

3 Claims, 2 Drawing Figures

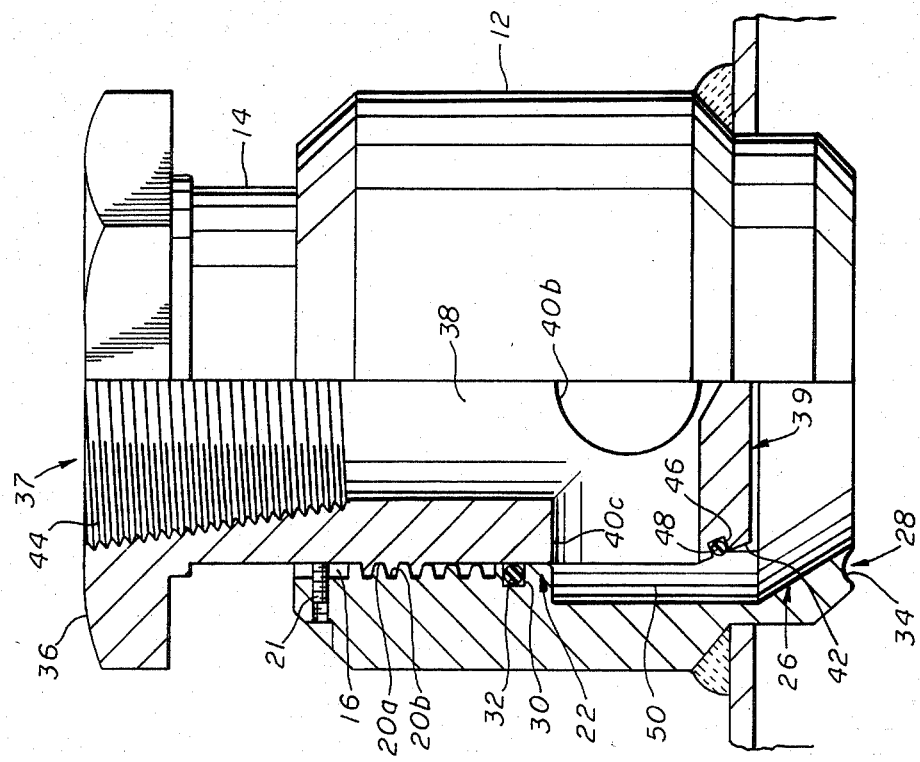
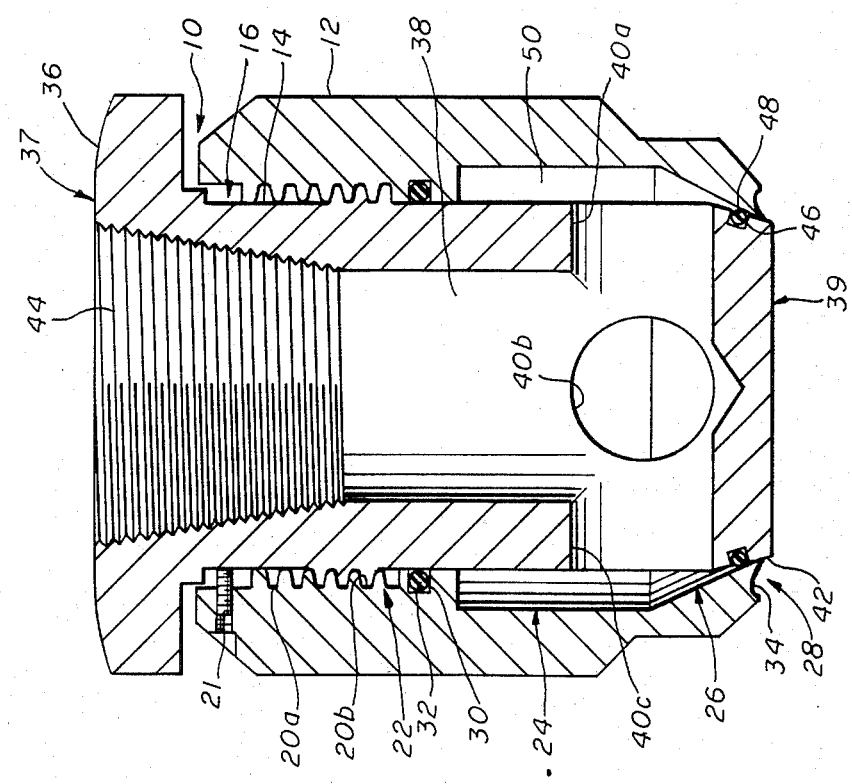

VALVE APPARATUS

BACKGROUND OF THE INVENTION

The present invention relates generally to valve apparatus and more specifically relates to valves for venting or draining fluids from a conduit or container.

Many valves presently in use in industrial applications for venting or draining fluids from containers are bulky both in terms of structure and in terms of the means of mounting. This can be a particular drawback in applications involving containers such as pipelines or railroad tank cars because of spatial concerns. Furthermore, installation of a value in an existing length of pipe often requires the breaking off of the line and the insertion of a "T" coupling to accommodate the new valve. Accordingly, the present invention overcomes the deficiencies of the prior art by providing a compact, low profile venting valve which may be coupled to an existing pipeline without the necessity of breaking the structural integrity thereof.

SUMMARY OF THE INVENTION

The valve includes a housing and a stem longitudinally movable therein between a first, "closed", position and a second, "open", position. Within a lower portion of the valve an annulus exists between the stem and the housing, such stem and housing adapted for sealing engagement, or to couple with a sealing instrumentality, beneath such annulus and proximate a second end of the valve. In a preferred embodiment, the stem is of a generally cylindrical form and includes a cavity extending from the upper end, longitudinally therein, and a plurality of radial ports proximate the lower end thereof providing fluid communication between the periphery of the stem and the cavity. These ports are placed such that when the stem is in the second "open", position they are in general registry with the aforementioned annulus. When stem is in this second, "open", position, the annulus is placed in fluid communication with the fixture to which the valve is affixed and the fluids therein may pass to the annulus through the ports and into the cavity in the stem, exiting the valve at the upper end of the stem.

BRIEF DESCRIPTION OF THE DRAWINGS

FIG. 1 shows a valve in accordance with the present invention in vertical cross section, depicted in closed position.

FIG. 2 shows the valve of FIG. 1 in partially cutaway view affixed to a wall of a container or fixture and depicted in open position.

DETAILED DESCRIPTION OF A PREFERRED EMBODIMENT

Referring now to the drawings in more detail, particularly to FIG. 1, therein is illustrated a valve 10 in accordance with the present invention, shown in longitudinal cross section and illustrated in "closed" position. Valve 10 includes as major elements a housing 12 and a stem 14, stem 14 adapted to be engageable with, and movable within, a longitudinal aperture 16 through housing 12. Housing 12 is adapted to be secured to the pipe or container to be drained by inserting shank 13 into an orifice in the container and then securing by means of welding housing 12 to the container. It will be appreciated that housing 12 may be adapted for other means of mounting, for example, threaded or bolted flange mountings. Housing 12 and stem 14 may be constructed of a variety of materials in accordance with the intended environment in which the valve is to be situated. For applications wherein the valve will contact petroleum fluids, carbon steel has been found highly satisfactory, although other metals are also suitable, such as monel or stainless steel. It will be appreciated that various plastics could also be useful as materials in certain applications, for example, in highly corrosive environments.

Housing 12 and stem 14 are each preferably of generally cylindrical form, as is housing aperture 16 with which stem 14 is engaged. Stem 14 is preferably movable within housing 12 by means of a plurality of cooperatively engageable threads on the two parts, illustrated as a part of housing 12 at 20a and as a part of stem at 20b. A stop 21, such as a set screw is provided to prevent the inadvertent removal of stem 14 from housing 12.

Referring now just to the preferred embodiment of housing 12, it will be seen that at least three general portions define the diameter of aperture 16: The first portion 22, in which housing threads 20a are located; a second portion 24 across which aperture 16 has a greater diameter than across first portion 22; and a lip portion 26 extending radially inward and across the inner most portion of which aperture 16 is of a lesser diameter than across said first portion, and of which at least the inner extremity is preferably deformable, illustrated generally at 28. First portion 22 may also contain a peripheral groove 30 suitable for retaining a sealing member, preferably a resilient sealing member such as conventional resilient o-ring 32. The taper of lip 26 from the nominal diameter of second portion 24 to inner extremity 28 is preferably accomplished at an acute angle relative to the longitudinal axis of housing 12. The deformable extremity 28 of lip 26 may be accomplished by a circumferential groove 34 placing a taper in the lower surface of extremity 28.

Referring now just to the preferred embodiment of stem 14, it will be seen that stem 14 includes: a head 36 having a hexagonal lateral cross section proximate first end 37 of said stem to facilitate the rotation of stem 14 with a wrench; a cavity 38 extending from first end 37 of stem 14 generally longitudinally therein; a plurality of ports 40a, 40b, 40c radially disposed around the outer periphery of stem 14 proximate second end 39 thereof and extending to cavity 38 to provide fluid communication therebetween; and a peripheral seat surface 42 between ports 40a, 40b, 40c and second end 39 of stem 14. Stem 14 may also contain threads 44 or another instrumentality whereby a drain pipe or conduit may be coupled to first end 37 of stem 14 to direct fluids exiting therefrom in a desired path. Seat surface 42 is radially bevelled from the normal diameter of stem 14 toward the longitudinal axis thereof, such bevel being at an angle more acute than the aforementioned taper of said lip portion 26 of housing 12 against which said seat will rest when stem 14 is in a first, "closed", position. Seat surface 42 referably contains a circumferential groove 46 for retaining a sealing member, again preferably a conventional resilient o-ring 48. Groove 46 is positioned such that o-ring 48 will contact lip 26 and form an occlusive seal therebetween when stem 14 is in the first, "closed", position. It is preferable that stem 14 have a plurality of ports 40a, 40b, 40c, as illustrated in FIG. 1, each of a diameter such that a maximum flow rate may be achieved through the combined area of the ports. Further, it will be appreciated that cavity 38 should also be of a suitable diameter to facilitate the desired flow rate through valve 10.

Referring now to both FIGS. 1 and 2, in FIG. 2 therein is shown the valve of FIG. 1 in partially cutaway view, affixed to the wall of a container 41, depicted in open position. In the intended operation of valve 10, stem 14 is threaded into housing 12 into the closed position shown in FIG. 1. Seat surface 42 contacts lip 26 forming a seal between housing 12 and stem 14. An auxiliary occlusive seal is provided by o-ring 48 contacting lip 26. It will be appreciated that the disparate angles of seat surface 42 and lip 26 relative to the longitudinal axis of valve 10 allows stem 14 to be progressively tightened against lip 26, deforming inner extremity 28 thereof and improving the seal therewith.

As stem 14 is rotated and moved to a second, "open", position as shown in FIG. 2, fluid may enter aperture 16 and annulus 50 between stem 14 and second portion 24 of housing 12, the fluid then flows through ports 40a, 40b, and 40c into cavity 38 and exits the valve through first end 37 of stem 14. O-ring 32 in housing groove 30 maintains an occlusive seal between housing 12 and stem 14, thereby preventing the leakage of fluid past the exterior of stem 14.

Many modifications and variations besides those specifically mentioned may be made in the techniques and structures discussed herein and illustrated in the accompanying drawings without departing substantially from the concept of the present invention. For example, the stem may be adapted to move downwards relative to the housing to open, so as to potentially protrude into the container being vented, and to move upwards relative to the housing to close. Further, the annulus for fluid flow between the housing and stem may be achieved partially or in full by a reduction in the diameter of at least the lower section of the stem. Additionally, many methods of forming an occlusive seal between two surfaces are known and could be applied to the present invention in place of the deformable lip-seat surface engagement of the illustrated embodiment. Accordingly, it should be clearly understood that the forms of the invention described and illustrated herein are exemplary only and are not intended as limitations on scope of the present invention.

The embodiments of the invention in which exclusive property or privilege is claimed are defined as follows:

1. A valve for venting fluids from a container, comprising:
   (a) a housing securable to said container having a longitudinal aperture therethrough, said housing having a first portion within said aperture, said first portion having a threaded section, said housing further having an inwardly radial lip portion around the periphery of a first end of said housing aperture, at least a portion of said lip portion being deformable, the inner diameter of said aperture at said lip portion being less than the inner diameter of said housing aperture across said first portion of said housing;
   (b) a stem mateable with said longitudinal housing aperture, said stem being generally cylindrical and threadably engaged with said threaded section of said housing, said stem further having a generally longitudinal cavity extending from an opening at a first end of said stem, and having at least one radial port proximate a second end of said stem, said port connecting said cavity to the periphery of said stem, said stem also having a peripheral seat surface between said port and said second end of said stem, said seat surface being radially bevelled toward the longitudinal access of said stem and containing a circumferential groove having a sealing member retained therein, said stem also having a means for connecting a drain conduit to said stem at said opening at said first end of said stem;
   (c) means for moving said stem between a first position and second position relative to said housing, said means including a threaded portion on the periphery of said stem cooperatively engageable with said threaded portion within said longitudinal housing aperture;
   (d) means for occlusively sealing between said stem and said housing when said stem is in said first position, said means comprising a contact surface on the periphery of said stem, and a lip on being engageable with said contact surface on said stem when said stem is in said first positions, said means for this including a resilient sealing member positioned to contact both said stem and said housing when said stem is in said first position;
   (e) means for allowing the passage of said fluid through said stem when said stem is in said second position;
   (f) means for facilitating the rotation of said stem relative to said housing; and
   (g) means for preventing the inadvertent removal of said stem from said housing.

2. A valve for venting fluids from a container, comprising:
   a housing securable to said container, said housing having a longitudinal aperture therethrough, said housing further having (1) a first portion in which housing threads are located, (2) a second portion having a greater diameter than said first portion, and (3) a lip portion extending radially inwardly and across the innermost portion of said aperture, said lip portion being of lesser diameter than said first portion, at least the inner extremity thereof being deformable,
   (b) a stem mateable with said longitudinal housing aperture,
   (c) means for moving said stem between a first position and a second position relative to said housing,
   (d) means for occlusively sealing between said stem and said housing when said stem is in said first position,
   (e) means for allowing the passage of said fluids through said stem when said stem is in said second position,
   (f) means for facilitating the rotation of said stem relative to said housing, and
   (g) means for preventing the inadvertent removal of said stem from said housing.

3. The valve as disclosed in claim 1, wherein said means for preventing the inadvertent removal of said stem from said housing is a stop such as a set screw or the like.

* * * * *